United States Patent
Jacolot et al.

(10) Patent No.: US 12,036,594 B2
(45) Date of Patent: Jul. 16, 2024

(54) METHOD AND ELECTRONIC DEVICE FOR DETERMINING THE TEMPERATURE OF A METAL STRIP, RELATED CONTROL METHOD, COMPUTER PROGRAM, CONTROL APPARATUS AND HOT ROLLING INSTALLATION

(71) Applicant: ArcelorMittal, Luxembourg (LU)

(72) Inventors: Ronan Jacolot, Landonvillers (FR); Didier Huin, Nancy (FR); Christian Moretto, Hayange (FR); Daniele Corsello, Nancy (FR)

(73) Assignee: ARCELORMITTAL, Luxembourg (LU)

( * ) Notice: Subject to any disclaimer, the term of this patent is extended or adjusted under 35 U.S.C. 154(b) by 1093 days.

(21) Appl. No.: 16/626,173

(22) PCT Filed: Jun. 26, 2017

(86) PCT No.: PCT/IB2017/053804
§ 371 (c)(1),
(2) Date: Dec. 23, 2019

(87) PCT Pub. No.: WO2019/002910
PCT Pub. Date: Jan. 3, 2019

(65) Prior Publication Data
US 2020/0156129 A1  May 21, 2020

(51) Int. Cl.
*B21B 37/76* (2006.01)
*B21B 45/02* (2006.01)
(Continued)

(52) U.S. Cl.
CPC .......... *B21B 37/76* (2013.01); *B21B 45/0218* (2013.01); *C21D 1/84* (2013.01);
(Continued)

(58) Field of Classification Search
None
See application file for complete search history.

(56) References Cited

U.S. PATENT DOCUMENTS

| | | |
|---|---|---|
| 2003/0089431 A1 | 5/2003 | Gramchow et al. |
| 2012/0318478 A1 | 12/2012 | Weinzierl et al. |
| 2013/0030561 A1 | 1/2013 | Imanari |

FOREIGN PATENT DOCUMENTS

| | | |
|---|---|---|
| CN | 1425076 A | 6/2003 |
| CN | 101462126 A | 6/2009 |

(Continued)

OTHER PUBLICATIONS

Saroj Biswas et al., "Optimal Temperature Tracking for Accelerated Cooling Processes in Hot Rolling of Steel", College of Engineering, Temple University, Philadelphia, PA, 19122, 1995, pp. 1-14.

(Continued)

*Primary Examiner* — Sean Shechtman
(74) *Attorney, Agent, or Firm* — Davidson Kappel LLC (57) ABSTRACT

A method for determining the temperature of a metal strip (1) inside a cooling apparatus (4) of a hot rolling installation is implemented by an electronic device (12). This method includes acquiring a temperature measure of a strip portion at a current time instant; estimating, at the current time instant, a heat flux extracted from the strip portion inside the cooling apparatus according to a thermal model, and computing a strip portion temperature at a next time instant from the acquired temperature measure and the estimated extracted heat flux. The thermal model models an air cooling of the strip portion, a coolant header cooling of the strip portion by a coolant header and a remaining coolant cooling of the strip portion, wherein for the coolant header cooling the model models both an impingement cooling of the strip portion and a parallel flow cooling of the strip portion.

17 Claims, 6 Drawing Sheets

(51) Int. Cl.

| | | |
|---|---|---|
| *C21D 1/84* | (2006.01) | |
| *C21D 8/02* | (2006.01) | |
| *C21D 9/46* | (2006.01) | |
| *C21D 11/00* | (2006.01) | |
| *G01K 13/04* | (2006.01) | |
| *G01K 17/08* | (2006.01) | |

(52) U.S. Cl.
CPC .............. *C21D 8/0263* (2013.01); *C21D 9/46* (2013.01); *C21D 11/005* (2013.01); *G01K 13/04* (2013.01); *G01K 17/08* (2013.01)

(56) References Cited

FOREIGN PATENT DOCUMENTS

| | | |
|---|---|---|
| CN | 102371283 A | 3/2012 |
| CN | 103611734 A | 3/2014 |
| CN | 105327949 A | 2/2016 |
| CN | 105522004 A | 4/2016 |
| CN | 105652913 A | 6/2016 |
| CN | 106311778 A | 1/2017 |
| JP | H07214132 A | 8/1995 |
| JP | 2000317513 A | 11/2000 |
| JP | 2001234251 A | 8/2001 |
| JP | 2011200914 A | 10/2011 |
| JP | 2012000663 A | 1/2012 |
| JP | 2013000765 A | 1/2013 |
| JP | 2013180321 A | 9/2013 |
| JP | 2014000593 A | 1/2014 |
| JP | 2014217848 A | 11/2014 |
| JP | 2015080788 A | 4/2015 |
| JP | 2016209897 A | 12/2016 |
| JP | 2017001086 A | 1/2017 |
| KR | 20120130786 A | 12/2012 |
| SU | 759165 A1 | 8/1980 |
| SU | 1131461 A3 | 12/1984 |
| WO | WO9849354 A1 | 11/1998 |
| WO | WO2014006681 A1 | 1/2014 |

OTHER PUBLICATIONS

Geoffrey Franco, "Boiling Heat Transfer During Cooling of a Hot Moving Steel Plate by Multiple Top Jets" The University of British Columbia, 2006, pp. 1-102.

Seouk Park, "Numerical Analysis for Film Boiling Heat Transfer of a Moving Hot Steel Plate", ISIJ International, vol. 51, No. 5, 2010, pp. 1-5.

Seouk Park, "Effects of Cooling Water Supply Nozzle Array on Cooling Performance of Run Out Table in Hot Rolling Process", ISIJ International, vol. 53, No. 1, 2012, pp. 1-5.

Fuchang Xu, "Finite Element Simulation of water Cooling Process of Steel Strips on Runout Table", The University of British Columbia, Mar. 2006, pp. 1-240.

Wolfgang Timm et al, "Modelliernng des Warmeubergangs beim Strahlsieden auf stark uberhitzten Oberflachen", 2006, pp. 1-4. (along with machine translation).

Corresponding Search Report for PCT/IB2017/053804 filed on Jun. 26, 2017.

Nicolas Pethe al. (2011): Dynamic Run-Out Table Cooling Simulator and Temperature Controllers, p. 1 to 8.

METHOD AND ELECTRONIC DEVICE FOR DETERMINING THE TEMPERATURE OF A METAL STRIP, RELATED CONTROL METHOD, COMPUTER PROGRAM, CONTROL APPARATUS AND HOT ROLLING INSTALLATION

FIELD OF THE INVENTION

The present invention relates to a method for determining the temperature of a metal strip, the strip being movable inside a cooling apparatus of a hot rolling installation, the method being implemented by an electronic determination device.

The invention also relates to a method for controlling a cooling apparatus of a hot rolling installation.

The invention also relates to a non-transitory computer-readable medium including a computer program including software instructions which, when executed by a processor, implement such a method.

The invention also relates to an electronic determination device for determining the temperature of a metal strip, the strip being movable inside a cooling apparatus of a hot rolling installation.

The invention also relates to a control apparatus for controlling a cooling apparatus and to a hot rolling installation for delivering a metal strip, such as a hot-rolled steel strip.

BACKGROUND OF THE INVENTION

The article "*Dynamic Run-Out Table Cooling Simulator and Temperature Controllers*" from Nicolas PETHE and al. (2011) concerns the control of steel strip cooling after hot rolling. It describes a dynamic run-out table cooling simulator which has been developed to predict temperature property accurately for a wide range of steel chemical compositions and strip dimensions, based on coupling between physically grounded thermal and metallurgical models. It discloses a controller based on model predictions and allowing controlling strip temperature on several positions on the table.

In the section "*Modeling of Strip Cooling on Run-Out Table*", this article further describes thermal and metallurgical models that are coupled to predict temperature property, in particular the strip temperature, firstly the metallurgical model and secondly the thermal model.

Regarding the thermal model, this article teaches that in order to properly compute the strip thermal path, heat transfer equation has to be solved with account for various phenomena occurring at the strip surfaces. While traveling on the run-out table a strip can be cooled by air; water coming from the headers; and water remaining on the strip after it passes the header.

The temperature of the hot-rolled steel strip needs to be determined accurately because the equipment upstream of the run-out table, in particular the finishing mill, induce disturbances, such as variations in the strip temperature at the entry of the run-out table or accelerations of the strip. These disturbances result in variations in the cooling of the strip and therefore in its temperature at the time of its winding, and these variations are liable to cause a degradation of the steel strip mechanical properties, leading to a derating of the corresponding steel coil.

However, the temperature of the hot-rolled steel strip which is determined from this thermal model is sometimes not sufficiently accurate.

SUMMARY OF THE INVENTION

A method and a related electronic device are provided for determining the temperature of a metal strip more accurately.

For this purpose, a method is provided for determining the temperature of a metal strip, the strip being movable inside a cooling apparatus of a hot rolling installation, the method being implemented by an electronic determination device and comprising:
  acquiring a measure of a temperature of a strip portion at a current time instant;
  estimating, at the current time instant, a heat flux extracted from the strip portion inside the cooling apparatus according to a thermal model,
  the thermal model being configured for modeling:
    an air cooling corresponding to the cooling of the strip portion by air radiation and air convection,
    a coolant header cooling corresponding to the cooling of the strip portion by at least one coolant header, and
    a remaining coolant cooling corresponding to the cooling of the strip portion by coolant remaining on the strip portion after the strip portion passed under the at least one coolant header;
  computing a temperature of the strip portion at a next time instant from the acquired measure of the temperature and the estimated extracted heat flux;
  wherein, for the coolant header cooling, the thermal model is further configured for modeling both:
    an impingement cooling corresponding to the cooling of the strip portion by coolant impinging from the at least one coolant header, and
    a parallel flow cooling corresponding to the cooling of the strip portion by coolant falling at a given distance from the at least one coolant header.

The method according to the present disclosure provides, regarding the coolant header cooling, a thermal model which is configured for modeling both an impingement cooling corresponding to the cooling of the strip portion by coolant falling under the at least one coolant header and a parallel flow cooling corresponding to the cooling of the strip portion by coolant falling at a given distance from the at least one coolant header.

The temperature of a metal strip determined with the method according to the present disclosure is therefore more accurate.

Furthermore, the method according to the present disclosure is more robust. Indeed, its implementation in several distinct plants shows, as it will be explained in further details in the following of the description, that the method according to the present disclosure is performing in several industrial configurations since there is no typical production line in the plants and the plants are almost different from one to another.

According to other advantageous aspects of the present disclosure, the method comprises one or several of the following features, taken individually or according to any technically possible combination:
  the thermal model for the impingement cooling depends on an impact diameter and on a Reynolds number of the coolant;

the estimated extracted heat flux due to the impingement cooling satisfies the following equation:

$$\varphi(T(t)) = Q_{FB} \cdot Re^{0.5} \cdot Pr^{1/6} \cdot \frac{(\lambda_l \cdot \lambda_v \cdot \Delta T_{sub} \cdot (T(t) - T_{sat}))^{0.5}}{D_{imp}}$$

where:
- $\lambda_l$ and respectively $\lambda_v$ are thermal conductivities of the coolant in liquid state and respectively in the gaseous state,
- $\Delta T_{sub}$ is equal to $T_{sat} - T_{coolant}$, in Celsius degrees,
- $T_{sat}$ is a saturation temperature, from liquid state to gaseous state of the coolant, in Celsius degrees,
- $T_{coolant}$ is the temperature of the coolant, in Celsius degrees,
- T(t) is the acquired measure of the strip portion temperature at the current time instant, in Celsius degrees,
- $D_{imp}$ is the impact diameter,
- Re is the Reynolds number of the coolant for the at least one coolant header,
- Pr is the Prandtl number of the coolant, and
- $Q_{FB}$ is a predefined coefficient;
  the thermal model for the parallel flow cooling depends on a saturation temperature of the coolant;
  the estimated extracted heat flux due to the parallel flow cooling satisfies the following equation:

$$\varphi(T(t)) = Q_{FB\_//1} \cdot \left( Q_{FB\_//2} - Q_{FB\_//3} \cdot \frac{T_{sat} - \Delta T_{sub}}{(T(t) - T_{sat})^{0.8} \cdot (T(t) - T_{coolant})} \right)$$

where
- $T_{sat}$ is a saturation temperature, from liquid state to gaseous state of the coolant, in Celsius degrees,
- $\Delta T_{sub}$ is equal to $T_{sat} - T_{coolant}$, in Celsius degrees,
- $T_{coolant}$ is the temperature of the coolant, in Celsius degrees,
- T(t) is the acquired measure of the strip portion temperature at the current time instant (t), in Celsius degrees, and
- $Q_{FB\_//1}$, $Q_{FB\_//2}$, $Q_{FB\_//3}$ are a predefined coefficients;
  the thermal model for the remaining coolant cooling depends on a radiative air cooling flux, on an extracted heat flux previously estimated for the parallel flow cooling and on a length covered by the substrate portion within a remaining coolant section of the cooling apparatus;
  the estimated extracted heat flux due to the remaining coolant cooling satisfies the following equation:

$$\varphi(T(t)) = \max\left( \text{radiative } (T(t)) + \text{convective } (T(t)), \frac{\varphi_{last\_//}}{2} \cdot e^{length} \right)$$

where:
- radiative (T(t)) and respectively convective (T(t)) are the radiative air cooling flux and respectively the convective air cooling flux,
- $\varphi_{last\_//}$ is the extracted heat flux previously estimated for the parallel flow cooling, and
- length is the length covered by the strip portion within the remaining coolant section;
  the thermal model for the air radiation cooling depends on a strip portion temperature and on the Stefan constant;
  the estimated extracted heat flux due to the air radiation cooling satisfies the following equation:

radiative$(T(t)) = \sigma \cdot \varepsilon \cdot ((T(t)+273)^4 - (T_a+273)^4)$ where:
- $\sigma$ is the Stefan constant,
- $\varepsilon$ is the emissivity of the strip portion,
- T(t) is the acquired measure of the strip portion temperature at the current time instant, in Celsius degrees, and
- $T_a$ is the air temperature, in Celsius degrees;
  the thermal model for the air convection cooling depends on a strip portion temperature and on a heat exchange coefficient;
  the estimated extracted heat flux due to the air convection cooling satisfies the following equation:

convective $(T(t)) = H \cdot (T(t) - T_a)$ where:
- T(t) is the acquired measure of the strip portion temperature at the current time instant (t), in Celsius degrees,
- $T_a$ is the air temperature, in Celsius degrees, and
- H is the heat exchange coefficient and satisfies:

$$H = \frac{2}{3} \cdot \lambda_{air} \cdot Re_{air} \cdot Pr_{air} \cdot \frac{1}{l} \text{ if } Re_{air} \leq 10^5, \text{ or}$$

$$H = \lambda_{air} \cdot \frac{0.036 \cdot Re_{air}^{0.8} \cdot Pr_{air}}{1 + 0.83 \cdot (Pr_{air}^{0.6} - 1)} \cdot \frac{1}{l} \text{ if } Re_{air} > 10^5,$$

with $\lambda_{air}$ the thermal conductivity of the air, $Re_{air}$ the Reynolds number of the air, $Pr_{air}$ the Prandtl number of the air and l the length of the strip portion cooled by the air;
the extracted heat flux is estimated for at least one surface among an upper surface and a lower surface of the strip portion, preferably for both upper and lower surfaces of the strip portion;
the coolant includes water; and
the metal strip is a hot-rolled steel strip.

The subject-matter of the present disclosure is also a method for controlling a cooling apparatus of a hot rolling installation, the method being implemented by an electronic control apparatus and comprising:
- determining the temperature of a metal strip, the strip being movable inside the cooling apparatus, and
- controlling the cooling apparatus according to the determined temperature, wherein determining the temperature is implemented with the method as defined above.

The subject-matter of the present disclosure is also a non-transitory computer-readable medium including a computer program including software instructions which, when executed by a processor, implement a method as defined above.

The subject-matter of the present disclosure is also an electronic determination device for determining the temperature of a metal strip, the strip being movable inside a cooling apparatus of a hot rolling installation, the electronic determination device comprising:
- an acquisition module configured for acquiring a measure of a temperature of a strip portion at a current time instant;
- an estimation module configured for estimating, at the current time instant, a heat flux extracted from the strip portion inside the cooling apparatus according to a thermal model, the thermal model being configured for modeling:

an air cooling corresponding to the cooling of the strip portion by air radiation and air convection, a coolant header cooling corresponding to the cooling of the strip portion by at least one coolant header, and a remaining coolant cooling corresponding to the cooling of the strip portion by coolant remaining on the strip portion after the strip portion passed under the at least one coolant header;

a computation module configured for computing a temperature of the strip portion at a next time instant from the acquired measure of the temperature and the estimated extracted heat flux;

wherein, for the coolant header cooling, the thermal model is further configured for modeling both:

an impingement cooling corresponding to the cooling of the strip portion by coolant falling under the at least one coolant header, and a parallel flow cooling corresponding to the cooling of the strip portion by coolant falling at a given distance from the at least one coolant header.

The subject-matter of the present disclosure is also a control apparatus for controlling a cooling apparatus of a hot rolling installation, the control apparatus comprising an determination device for determining the temperature of a metal strip, the strip being movable inside the cooling apparatus, and a control device for controlling the cooling apparatus from the temperature determined by the determination device, wherein the determination device is as defined above.

The subject-matter of the present disclosure is also a hot rolling installation for delivering a metal strip, such as a hot-rolled steel strip, the hot rolling installation comprising a cooling apparatus for cooling the metal strip, and a control apparatus for controlling the cooling apparatus, wherein the control apparatus is as defined above.

BRIEF DESCRIPTION OF THE DRAWINGS

The invention will be better understood upon reading of the following description, which is given solely by way of example and with reference to the appended drawings, wherein.

DETAILED DESCRIPTION OF PREFERRED EMBODIMENTS

In the following of the description, the expression "substantially equal to" defines a relation of equality to plus or minus 10%, preferably to plus or minus 5%.

By "coolant", as used herein, is meant a cooling fluid. The coolant, also called cooling fluid, includes for example water, and is preferably water.

The term "modeling" refers to a numerical simulation, such as a simulation run on a computer.

Figure 1:
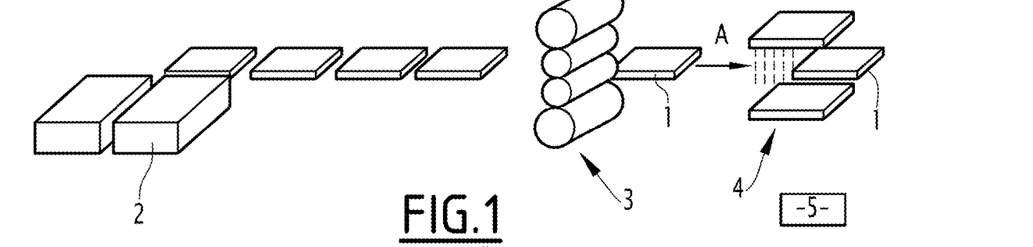
FIG. 1 is a schematic illustration of a hot-rolling installation including a cooling apparatus for cooling a metal strip and a control apparatus for controlling the cooling apparatus according to an embodiment of the invention.

In FIG. 1, a hot-rolling installation for delivering a metal strip 1, such as a hot-rolled steel strip, includes a furnace 2 and a rolling mill 3. The hot-rolling installation also includes a cooling apparatus 4 for cooling the metal strip 1 and a control apparatus 5 for controlling the cooling apparatus 4.

The metal strip 1 which, on discharge from the furnace 2 and the rolling mill 3, is moved in a running direction A. For example, the running direction A of the strip 1 is substantially horizontal.

The strip 1 then passes through the cooling apparatus 4, in which the strip is cooled from an initial temperature, which is for example substantially equal to the temperature at the end of the rolling of the strip, down to a final temperature which is for example room temperature, i.e. about 20° C.

The strip 1 passes through the cooling apparatus 4 in the running direction A at a running speed which is preferably comprised between 1 m/s and 25 m/s.

The strip 1 is for example a metal plate, such as a hot-rolled steel strip, having a thickness comprised between 1 mm and 30 mm.

The initial temperature is for example greater than or equal to 600° C., notably greater than or equal to 800° C., or even greater than 1000° C.

In the cooling apparatus 4, such as a run-out table, at least one first cooling fluid jet is ejected on a first surface 6 of the strip 1, and at least one second cooling fluid jet is ejected on a second surface 7 of the strip 1. The cooling fluid, also called coolant, is for example water.

In the example illustrated, the strip 1 is running horizontally, so that the first surface 6 of the strip 1 is an upper surface, oriented upwards during the running of the strip 1, and the second surface 7 of the strip 1 is a lower surface, oriented downwards during the running of the strip 1.

In all the following, the selected orientations are indicative and are meant with respect to the Figures. In particular, the terms of «upstream» and «downstream» are meant relatively to the orientation selected in the Figures. These terms are used with respect to the running strip 1. Moreover, the terms of «transverse», «longitudinal» and «vertical» should be understood with respect to the running direction A of the strip 1, which is a longitudinal direction. In particular, the term of «longitudinal» refers to a direction parallel to the running direction A of the strip 1, the term of «transverse» refers to a direction orthogonal to the running direction A of the strip 1 and contained in a plane parallel to the first 6 and second 7 surfaces of the strip 1, and the term of «vertical» refers to a direction orthogonal to the running direction A of the strip 1 and orthogonal to the first 6 and second 7 surfaces of the strip 1.

Furthermore, by «length» a dimension of an object in the longitudinal direction will be referred to, by «width» a dimension of an object in a transverse direction, and by «height» a dimension of an object in a vertical direction.

Figure 2:
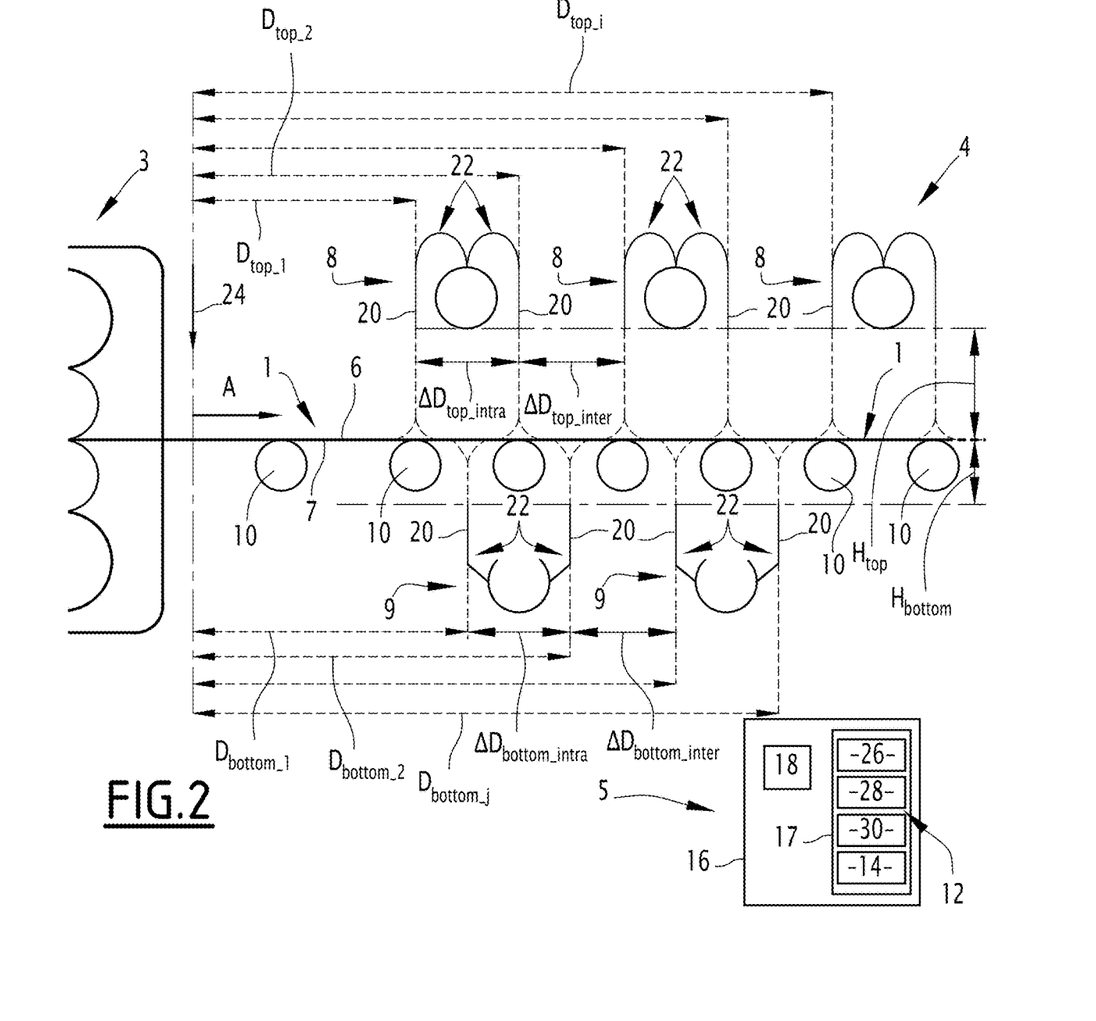
FIG. 2 is a schematic illustration of the cooling apparatus and of the control apparatus of FIG. 1.

The cooling apparatus 4 illustrated on FIG. 2 comprises at least one top valve 8 and/or at least one bottom valve 9. The cooling apparatus 4 comprises preferably several top valves 8 and/or several bottom valves 9, and still preferably several top valves 8 and several bottom valves 9. In the example of FIG. 2, only three top valves 8 and two bottom valves 9 are shown for simplicity of the drawings.

The cooling apparatus 4 comprises several rollers 10 for supporting the strip 1 and for contributing to the movement of the strip 1 in the moving direction A.

The control apparatus 5 comprises an electronic determination device 12 for determining the temperature of the metal strip 1, the strip 1 being as described above movable inside the cooling apparatus 4, and an electronic control device 14 for controlling the cooling apparatus 4 according to the temperature determined by the determination device 12.

The control apparatus 5 includes a processing unit 16 formed for example of a memory 17 and of a processor 18 coupled to the memory 17.

Each valve 8, 9 is configured for opening or closing the coolant flow 10 in the direction of the metal strip 1. Each top valve 8 is disposed above the strip 1. Each top valve 8 is preferably also disposed above the rollers 10. With a top valve 8, the coolant falls under the valve, i.e. flows downwards in the direction of the metal strip 1. Each bottom valve 9 is disposed under the strip 1. Each bottom valve 9 is preferably also disposed under the rollers 10. With a bottom valve 9, the coolant is ejected above the valve 9, i.e. upwards in the direction of the metal strip 1. In other words, the coolant is ejected substantially perpendicular to the metal strip 1 from each corresponding valve 8, 9.

The coolant includes for example water. The coolant is preferably water.

Each valve 8, 9 includes one or several headers, each header including at least one nozzle 20 whereby the coolant flows out. Each valve 8, 9 includes preferably several nozzles 20 which are for example dispatched into two rows 22 on both sides of the corresponding valve 8, 9. Each row 22 of nozzle(s) 20 is also called header.

In the example of FIG. 2, each valve 8, 9 includes two rows 22 of several nozzles 20. Each row 22 of nozzle(s) 20 is located at a respective distance $D_{top\_i}$, $D_{bottom\_j}$ from a pyrometer 24, where i is an index of a corresponding row 22 of a given top valve 8 and j is an index of a corresponding row 22 of a given bottom valve 9. In the example wherein the cooling apparatus 4 comprises for example nine top valves 8 and nine bottom valves 9, the skilled person will understand that the index i for the top rows is comprised between 1 and 18 and similarly that the index j for the bottom rows is comprised between 1 and 18.

The distance $D_{top\_1}$ for the first top row is for example substantially equal to 6 m and the next distances for the next top rows are according to the following relationship:

$$D_{top\_i+1} = D_{top\_i} + 0.9 \text{ m}$$

In other words, in this example, the distances $D_{top\_1}$, $D_{top\_2}$, $D_{top\_3}$, $D_{top\_4}$, $D_{top\_5}$, etc. are substantially equal to 6 m, 6.9 m, 7.8 m, 8.7 m and respectively 9.6 m. In addition, the distance $\Delta D_{top\_intra}$ between two rows 22 of a given top valve 8 is substantially equal to 0.9 m and the distance $\Delta D_{top\_inter}$ between two rows 22 of two successive top valves 8 is substantially equal to 0.9 m.

The distance $D_{bottom\_1}$ for the first bottom row is for example substantially equal to 6 m and the distance $D_{bottom\_2}$ for the second bottom row is substantially equal to 6.3 m, the next distances for the next bottom rows being according to the following relationship:

$$D_{bottom\_j+2} = D_{bottom\_j} + 0.9 \text{ m}$$

In other words, in this example, the distances $D_{bottom\_1}$, $D_{bottom\_2}$, $D_{bottom\_3}$, $D_{bottom\_4}$, $D_{bottom\_5}$, etc. are substantially equal to 6 m, 6.3 m, 6.9 m, 7.2 m and respectively 7.8 m. In addition, the distance $\Delta D_{bottom\_intra}$ between two rows 22 of a given bottom valve 9 is substantially equal to 0.3 m and the distance $\Delta D_{bottom\_inter}$ between two rows 22 of two successive bottom valves 9 is substantially equal to 0.6 m.

In the example of FIG. 2, each top valve 8 is at a same height $H_{top}$ relatively from the metal strip 1. In other words, for the top valves 8, all the nozzles 20 are separated from the metal strip 1 by a same distance $H_{top}$. The height $H_{top}$ is for example substantially equal to 2 m.

Alternatively, the height $H_{top}$ varies from one top valve 8 to the other.

Similarly, in the example of FIG. 2, each bottom valve 9 is at a same height $H_{bottom}$ relatively from the metal strip 1. In other words, for the bottom valves 9, all the nozzles 20 are separated from the metal strip 1 by a same distance $H_{bottom}$. The height $H_{bottom}$ is for example substantially equal to 0.15 m.

Alternatively, the height $H_{bottom}$ varies from one bottom valve 9 to the other.

For the determination of the temperature of the strip 1, the strip 1 is discretized by the determination device 12 into elementary elements, each elementary element being called portions or also slice.

The determination device 12 comprises an acquisition module 26 configured for acquiring a measure of a temperature Tk of a portion of the strip 1, also called strip portion, at a current time instant k.

The determination device 12 comprises an estimation module 28 configured for estimating, at the current time instant k, a heat flux $\varphi(T(k))$ extracted from the strip portion inside the cooling apparatus 4 according to a thermal model.

The determination device 12 comprises a computation module 30 configured for computing a temperature Tk+1 of the strip portion at a next time instant k+1 from the acquired measure of the temperature Tk and the estimated extracted heat flux $\varphi(T(k))$.

In other words, the determination device 12 is configured for simulating the cooling of the strip 1, in particular for computing the thermal evolution of the strip 1.

The electronic control device 14 is configured for controlling the cooling apparatus 4 according to the temperature determined by the determination device 12. In other words, the electronic control device 14 is configured for determining the flow for each valve 8, 9, and accordingly for determining which valve 8, 9 needs to be turned on or off. For example, based on a given cooling pattern, a given pyrometer position and an aimed temperature, the electronic control device 14 is configured for determining which valves 8, 9 need to be turned on or off in order to compensate for temperature variation and strip speed variation.

In the example of FIG. 2, the control device 14, the acquisition module 26, the estimation module 28 and the computation module 30 are for example each realized, i.e. implemented, as a software executable by the processor 18. The memory 17 of the processing unit 16 is then adapted to store a control software configured to control the cooling apparatus 4 according to the temperature determined by the determination device 12, an acquisition software configured to acquire a measure of a temperature Tk of a strip portion at a current time instant k, an estimation software configured to estimate, at the current time instant k, a heat flux φ(T(k)) extracted from the strip portion inside the cooling apparatus 4 according to the thermal model and a computation software configured to compute a temperature Tk+1 of the strip portion at a next time instant k+1 from the acquired measure of the temperature Tk and the estimated extracted heat flux φ(T(k)). The processor 18 of the processing unit 16 is then configured to execute the control software, the acquisition software, the estimation software and the computation software.

As a variant not shown, the control device 14, the acquisition module 26, the estimation module 28 and the computation module 30 are each in the form of a programmable logic component, such as a Field Programmable Gate Array or FPGA, or in the form of a dedicated integrated circuit, such as an Application Specific integrated Circuit or ASIC.

The thermal model is configured for modeling an air cooling corresponding to the cooling of the strip portion by air radiation and air convection; a coolant header cooling corresponding to the cooling of the strip portion by at least one coolant header, i.e. by at least one row 22 of nozzle(s); and a remaining coolant cooling corresponding to the cooling of the strip portion by coolant remaining on the strip portion after the strip portion passed under the at least one coolant header.

Figure 3:
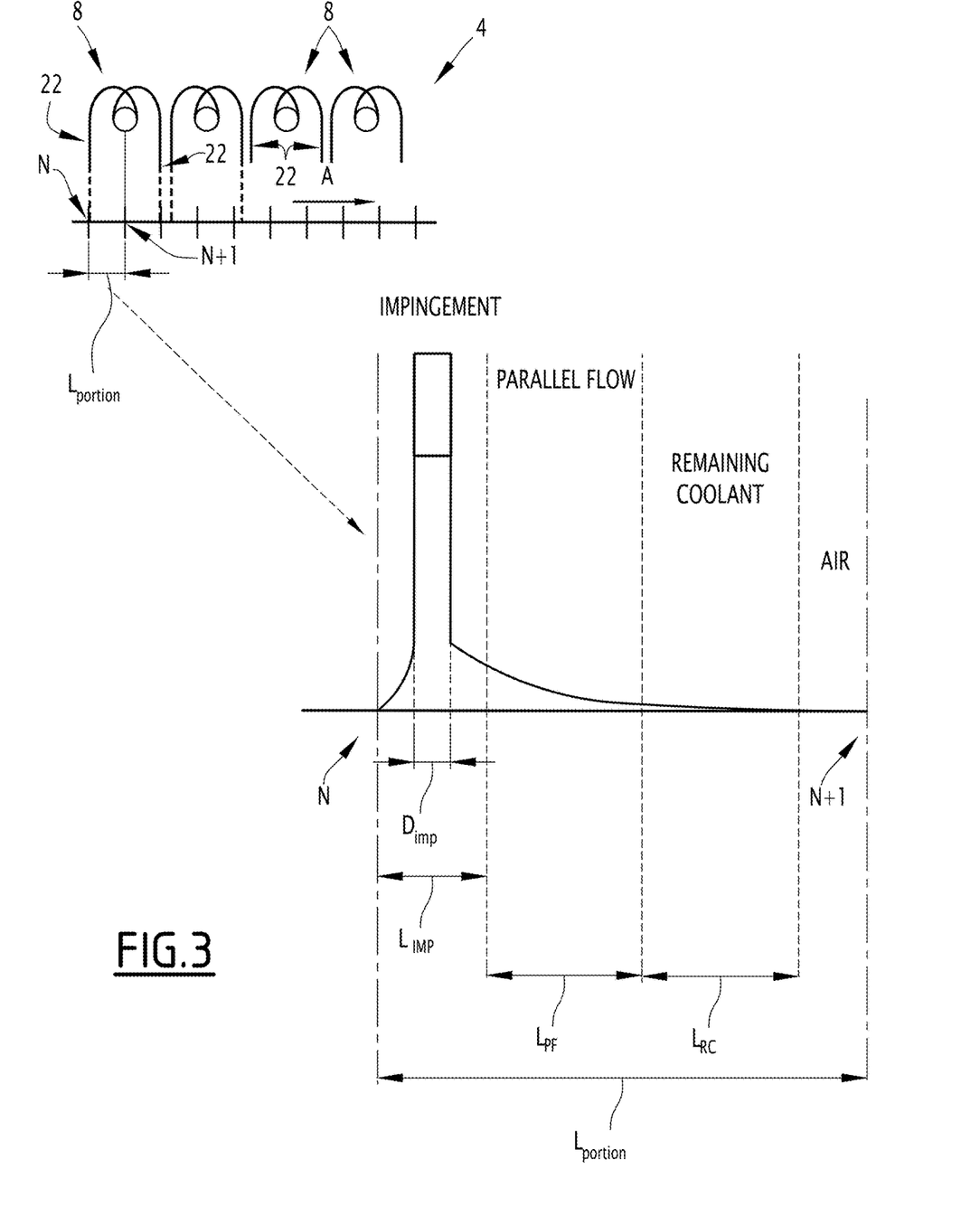
FIG. 3 is a schematic illustration of different cooling regimes while cooling a metal strip inside the cooling apparatus of FIG. 2, from a current position to a next position.

According to the present disclosure, regarding the coolant header cooling, the thermal model is further configured for modeling both an impingement cooling corresponding to the cooling of the strip portion by coolant impinging from the at least one coolant header, and a parallel flow cooling corresponding to the cooling of the strip portion by coolant falling at a given distance from the at least one coolant header, as shown in FIG. 3.

The impingement cooling, the parallel flow cooling, the remaining coolant cooling and the air cooling are also called cooling regimes.

The estimation module 28 is configured to estimate the extracted heat flux φ(T(k)) of the strip portion for at least one surface among the upper surface 6 and the lower surface 7 of the strip 1. The estimation module 28 is preferably configured to estimate the extracted heat flux φ(T(k)) for both upper and lower surfaces 6, 7 of the strip 1.

Due to gravity, it is not possible to have parallel flow or remaining coolant on the lower surface of the strip 1. The skilled person will therefore understand that the possible cooling regimes for the lower surface of the strip 1 are only impingement cooling and air cooling.

Accordingly, when the estimation module 28 is configured to estimate the extracted heat flux φ(T(k)) only for the upper surface 6 of the strip 1, the cooling regimes taken into account in the thermal model are the impingement cooling, the parallel flow cooling, the remaining coolant cooling and the air cooling for the upper surface 6 of the strip 1.

When the estimation module 28 is configured to estimate the extracted heat flux φ(T(k)) only for the lower surface 7 of the strip 1, the cooling regimes taken into account in the thermal model are the impingement cooling and the air cooling for the lower surface 7 of the strip 1.

When the estimation module 28 is preferably configured to estimate the extracted heat flux φ(T(k)) for both the upper surface 6 and the lower surface 7 of the strip 1, the cooling regimes taken into account in the thermal model are, on one hand, the impingement cooling, the parallel flow cooling, the remaining coolant cooling and the air cooling for the upper surface 6 of the strip 1, and on the other hand, the impingement cooling and the air cooling for the lower surface 7 of the strip 1.

The computation module 30 is configured for computing the temperature $T_{k+1}$ of the strip portion at the next time instant k+1 from the acquired measure of the temperature $T_k$ and the estimated extracted heat flux $\varphi_k$. For computing this temperature of the strip portion, the computation module 30 is for example configured to solve a heat equation, such as the following heat equation:

$$\begin{cases} \rho c_p \dfrac{dT(x,t)}{dt} = \lambda \dfrac{dT(x,t)^2}{dx^2} + q \\ \rho c_p \dfrac{dT(0,t)}{dt} = \sum \phi_{surf} \end{cases} \quad (1)$$

where:
- ρ is the mass density of the strip 1,
- $c_p$ is the specific heat capacity of the strip 1,
- λ is the thermal conductivity of the strip 1,
- q is the heat generated by the strip 1,
- T(x,t) is the temperature of the strip 1 for a position x and an instant time t, and
- $\Phi_{surf}$ is the total extracted heat flux of the strip portion for a given surface among the upper surface 6 and the lower surface 7 of the strip 1

In FIG. 3, $L_{portion}$ is the distance traveled by a given strip portion, or strip slice, between two successive time instants, for example the time instants k, k+1 corresponding to successive positions of the strip portion with successive position indexes N, N+1. In other words, this distance $L_{portion}$ is equal to the difference between the two positions corresponding to the two successive position indexes N, N+1.

When a given strip portion moves inside the cooling apparatus 4 along the running direction A from a current row 22 of nozzle(s) 20 up to a next row 22 of nozzle(s) 20 of top valve(s), its upper surface 6 successively benefits from the cooling of the successive aforementioned cooling regimes, i.e. the impingement cooling in an impingement zone, the parallel flow cooling in a parallel flow zone, the remaining coolant cooling in a remaining coolant zone and the air cooling in an air zone as shown in FIG. 3.

The impingement zone is centered on the position of current row 22 of nozzle(s) 20 along the running direction A. The length $L_{IMP}$ of the impingement zone is for example substantially equal to 3 times an impact diameter $D_{imp}$ along said direction A. The impact diameter $D_{imp}$ is the diameter of the coolant flow when impacting the strip 1 to cool it, as shown in FIG. 3. The value of the impact diameter $D_{imp}$ is for example comprised between 5 mm and 25 mm.

In the running direction A and for the upper surface 6, the parallel flow zone is the zone immediately after the impingement zone and adjacent to it. The length of the parallel flow zone is noted $L_{PF}$. The length of the parallel flow zone $L_{PF}$ is for example comprised between 0.1 m and 2 m. In the running direction A, the remaining coolant zone is the zone immediately after the parallel flow zone and adjacent to it. The length of the remaining coolant zone is noted $L_{RC}$. The length of the remaining coolant zone $L_{RC}$ is for example comprised between 0.1 m and 2 m. Lastly, the air zone is the zone immediately after the remaining coolant zone and adjacent to it. The air zone extends up to the impingement zone for the next row 22 of nozzle(s) 20 of the corresponding top valve 8.

When a given strip portion moves inside the cooling apparatus 4 along the running direction A from a current row 22 of nozzle(s) 20 up to a next row 22 of nozzle(s) 20 of top valve(s), its lower surface 7 successively benefits from the cooling of the successive aforementioned cooling regimes regarding the lower surface 7, i.e. the impingement cooling in the impingement zone and the air cooling in the air zone.

The impingement zone for the lower surface 7 is also centered on the position of current row 22 of nozzle(s) 20 of the corresponding bottom valve 9 along the running direction A. The length $L_{IMP}$ of the impingement zone is for example also substantially equal to 3 times the impact diameter $D_{imp}$ of the nozzle 20 of the corresponding bottom valve 9.

In the running direction A and for the lower surface 7, the air zone is the zone immediately after the impingement zone and adjacent to it. The air zone extends up to the impingement zone for the next row 22 of nozzle(s) 20 of the corresponding bottom valve 9.

Regarding the impingement cooling, the thermal model depends preferably on the impact diameter $D_{imp}$ and on a Reynolds number Re of the coolant.

Impingement corresponds to the coolant flowing from the header, or row 22 of nozzle(s), and impacting directly the strip 1. For the upper surface 6 of the strip 1, it corresponds accordingly to the coolant falling under the row 22 of nozzle(s), or header, of a respective top valve 8. For the lower surface 7 of the strip 1, it corresponds to the coolant flowing above the row 22 of nozzle(s), or header, of a respective bottom valve 9.

The estimated extracted heat flux due to the impingement cooling satisfies, for example, the following equation:

$$\varphi(T(t)) = Q_{FB} \cdot Re^{0.5} \cdot Pr^{1/6} \cdot \frac{(\lambda_l \cdot \lambda_v \cdot \Delta T_{sub} \cdot (T(t) - T_{sat}))^{0.5}}{D_{imp}} \quad (2)$$

where:
- $\lambda_l$ and respectively $\lambda_v$ are thermal conductivities of the coolant in liquid state and respectively in the gaseous state,
- $\Delta T_{sub}$ is equal to $T_{sat} - T_{coolant}$, in Celsius degrees,
- $T_{sat}$ is a saturation temperature, from liquid state to gaseous state of the coolant, in Celsius degrees,
- $T_{coolant}$ is the temperature of the coolant, in Celsius degrees,
- T(t) is the acquired measure of the strip portion temperature at the current time instant t, in Celsius degrees,
- $D_{imp}$ is the impact diameter,
- Re is the Reynolds number of the coolant for the at least one coolant header,
- Pr is the Prandtl number of the coolant, and
- $Q_{FB}$ is a predefined coefficient.

The thermal conductivities $\lambda_l$, $\lambda_v$, the saturation temperature $T_{sat}$, the impact diameter $D_{imp}$, the Reynolds number of the coolant Re, the Prandtl number of the coolant Pr and the predefined coefficient $Q_{FB}$ have predetermined values known from the estimation module 28.

The temperature of the coolant $T_{coolant}$ is preferably measured via a temperature sensor, not shown. Alternatively, the temperature of the coolant $T_{coolant}$ is a predefined parameter with a predetermined value known from the estimation module 28.

The skilled person will understand that t is the notation for the time instant when considered in a continuous manner and that the estimation module 28 is configured to discretize the time into successive time instants k, k+1 in order to estimate the extracted heat flux $\varphi(T(k))$.

Regarding the parallel flow, the thermal model cooling depends preferably on a saturation temperature of the coolant.

The estimated extracted heat flux due to the parallel flow cooling satisfies, for example, the following equation:

$$\varphi(T(t)) = Q_{FB\_//1} \cdot \left( Q_{FB\_//2} - Q_{FB\_//3} \cdot \frac{T_{sat} - \Delta T_{sub}}{(T(t) - T_{sat})^{0.8} \cdot (T(t) - T_{coolant})} \right) \quad (3)$$

where
- $T_{sat}$ is a saturation temperature, from liquid state to gaseous state of the coolant, in Celsius degrees,
- $\Delta T_{sub}$ is equal to $T_{sat} - T_{coolant}$, in Celsius degrees,
- $T_{coolant}$ is the temperature of the coolant, in Celsius degrees,
- T(t) is the acquired measure of the strip portion temperature at the current time instant (t), in Celsius degrees, and
- $Q_{FB\_//1}$, $Q_{FB\_//2}$, $Q_{FB\_//3}$ are a predefined coefficients.

The saturation temperature Tsat and the predefined coefficients $Q_{FB\_//1}$, $Q_{FB\_//2}$, $Q_{FB\_//3}$ have predetermined values known from the estimation module 28.

Regarding the remaining coolant cooling, the thermal model depends preferably on a radiative air cooling flux, on an extracted heat flux previously estimated for the parallel flow cooling and on a length covered by the substrate portion within a remaining coolant section of the cooling apparatus.

The estimated extracted heat flux due to the remaining coolant cooling satisfies, for example, the following equation:

$$\varphi(T(t)) = \max\left(\text{radiative }(T(t)) + \text{convective }(T(t)), \frac{\varphi_{last\_//}}{2} \cdot e^{length}\right) \quad (4)$$

where:
- radiative (T(t)) and respectively convective (T(t)) are the radiative air cooling flux and respectively the convective air cooling flux,
- $\varphi_{last\_//}$ is the extracted heat flux previously estimated for the parallel flow cooling, and
- length is the length covered by the strip portion within the remaining coolant section.

The air cooling is the sum of the air radiation cooling and of the air convection cooling.

Regarding the air radiation cooling, the thermal model depends preferably on a strip portion temperature and on the Stefan constant.

The estimated extracted heat flux due to the air radiation cooling satisfies, for example, the following equation:

$$\text{radiative}(T(t)) = \sigma \cdot \varepsilon \cdot ((T(t) + 273)^4 - (T_a + 273)^4) \quad (5)$$

where:
- $\sigma$ is the Stefan constant,
- $\varepsilon$ is the emissivity of the strip portion,
- T(t) is the acquired measure of the strip portion temperature at the current time instant (t), in Celsius degrees, and
- $T_a$ is the air temperature, in Celsius degrees.

The Stefan constant $\sigma$, the emissivity of the strip portion $\varepsilon$ and the air temperature $T_a$ have predetermined values known from the estimation module 28.

Regarding the air convection cooling, the thermal model depends preferably on a strip portion temperature and on a heat exchange coefficient H.

The estimated extracted heat flux due to the air convection cooling satisfies, for example, the following equation:

$$\text{convective}(T(t)) = H \cdot (T(t) - T_a) \tag{6}$$

where:
T(t) is the acquired measure of the strip portion temperature at the current time instant (t), in Celsius degrees,
$T_a$ is the air temperature, in Celsius degrees, and
the heat exchange coefficient H satisfies:

$$H = \frac{2}{3} \cdot \lambda_{air} \cdot Re_{air} \cdot Pr_{air} \cdot \frac{1}{l} \quad \text{if } Re_{air} \leq 10^5, \text{ or} \tag{7}$$

$$H = \lambda_{air} \cdot \frac{0.036 \cdot Re_{air}^{0.8} \cdot Pr_{air}}{1 + 0.83 \cdot (Pr_{air}^{0.6} - 1)} \cdot \frac{1}{l} \quad \text{if } Re_{air} > 10^5, \tag{8}$$

with $\lambda_{air}$ the thermal conductivity of the air, $Re_{air}$ the Reynolds number of the air, $Pr_{air}$ the Prandtl number of the air and l the length of the strip portion cooled by the air.

The thermal conductivity of the air $\lambda_{air}$ the Reynolds number of the air Reair, the Prandtl number of the air Prair and the air temperature Ta have predetermined values known from the estimation module 28.

Figure 4:
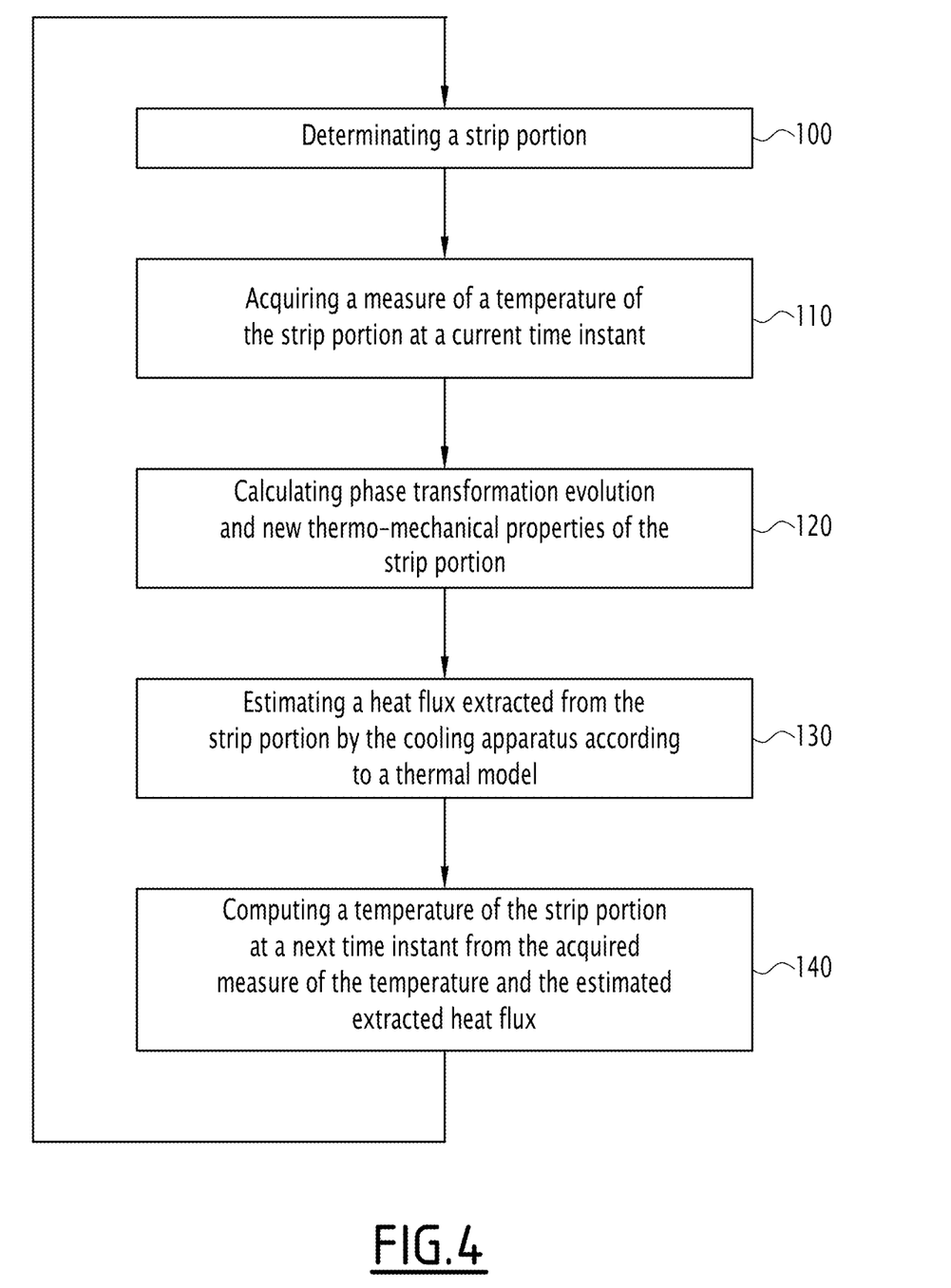
FIG. 4 is a flowchart of a method, according to an embodiment of the invention, for determining the temperature of the metal strip when moving inside the cooling apparatus of FIG. 2.

The operation of the electronic control apparatus 5, in particular of the determination device 12, according to the present disclosure will now be explained in view of FIG. 4 representing a flowchart of a method, according to the invention, for determining the temperature of the metal strip 1, the strip 1 being movable inside the cooling apparatus 4 of the hot rolling installation.

Initially, in step 100, the strip 1 is discretized into the elementary elements, called portions or slices.

For a given portion, or slice, the temperature and metallurgical profile is periodically updated by solving the heat equation, as it will be explained in further detail hereinafter, until it reaches the position of a coiling pyrometer, not shown. The method last until the final portion of the strip 1 reaches the coiling pyrometer position.

At each iteration, the given portion is displaced by a displacement equal to v×dt, with v a speed of the strip 1 along the running direction A and dt a sampling period, i.e. the time period between two successive time instants k, k+1. The strip speed is preferably considered to be constant during the sampling period dt.

During each iteration, a number of discrete positions Δpos of the strip portion then satisfies for example the following equation:

$$\Delta pos = \text{round}\left(\frac{v \cdot dt}{dx}\right) \tag{9}$$

where v is the strip speed,
dt is the sampling period,
dx is a sampling step, for example equal to 30 cm.

At the next step 110, a measure of a temperature $T_k$ of the strip portion at the current time instant k is acquired by the acquisition module 26 from a corresponding temperature sensor, not shown.

In optional addition, the determination device 12 then calculates, at the next step 120, a phase transformation evolution and new thermo-mechanical properties of the strip portion according to a metallurgical model. In this step, a metallurgical status of the portion, such as a percentage of austenite transformed, is updated based on a level of metallurgical transformation, and the thermo-mechanical properties of the strip, such as the density and/or the specific heat, are also updated. The metallurgical model is adapted to describe the decomposition of austenite phase into polygonal ferrite and then further into pearlite with account for steel chemical composition, austenite grain size out of the finishing rolling mill, as well as for the run-out table cooling path. This metallurgical model is grounded on the assumption of local equilibrium without partitioning of substitutional atoms. The nucleation of ferrite is assumed to occur at austenite grain edges and faces; the driving force for nucleation and the carbon concentration at the austenite/ferrite interface are computed with account for concentrations of alloying additions (Si, Mo, Cr, Ni, Cu, Al). Mixed mode of growth of nuclei is adopted where the instantaneous interphase boundary velocity during the austenite/ferrite transformation is calculated as the result of diffusion in austenite of carbon rejected by the transformation and mobility of iron atoms at the austenite/ferrite interface. With the increase of ferrite fraction, the carbon concentration in the remaining portions of austenite increases until the critical concentration is reached at which pearlite transformation begins. In the metallurgical model, the onset of pearlite transformation is described using Hultgren formalism.

In the next step 130, the heat flux $\varphi_k$ extracted from the strip portion inside the cooling apparatus 4 is estimated by the estimation module 28, at the current time instant k, according to the above described thermal model. The estimated extracted heat flux corresponds to the time period from the current time instant k to the next time instant k+1.

Based on the position of the strip portion with respect to current row 22 of nozzle(s) 20 of the corresponding top valve 8 and/or with respect to current row 22 of nozzle(s) 20 of the corresponding bottom valve 9, the estimation module 28 determines the cooling regime which applies to the upper surface 6 and/or to the lower surface 7 of the strip portion.

For the upper surface 6 of the strip portion, the cooling regime is determined among the impingement cooling which follows for example equation (2), the parallel flow cooling which follows for example equation (3), the remaining coolant cooling which follows for example equations (4) to (8) and the air cooling which follows for example equations (5) to (8).

For the lower surface 7 of the strip portion, the cooling regime is determined among the impingement cooling which follows for example equation (2) and the air cooling which follows for example equations (5) to (8).

Therefore, according to the present disclosure, the thermal model is, regarding the coolant header cooling, configured for modeling both the impingement cooling corresponding to the cooling of the strip portion by coolant impinging from the at least one coolant header 22, and a parallel flow cooling corresponding to the cooling of the strip portion by coolant falling at a given distance from the at least one coolant header 22. This given distance is for example greater than or equal to $L_{IMP}/2$, i.e. half of the length $L_{IMP}$ of the impingement zone, when the impingement zone is centered on the position of current row 22 of nozzle(s) 20 along the running direction A.

The computation module 30 then computes, in the next step 140, the temperature $T_{k+1}$ of the strip portion at the next time instant k+1 from the acquired measure of the temperature $T_k$ and the estimated extracted heat flux $\varphi_k$. For computing this temperature of the strip portion, the computation module 30 solves a heat equation, such as the equation (1).

The control device 14 finally controls the cooling apparatus 4 according to the temperature determined by the determination device 12. In particular, the control device 14 determines the flow for each valve 8, 9, and accordingly determines which valve 8, 9 needs to be turned on or off.

Thus, the method and the determination device 12 according to the present disclosure provide, regarding the coolant header cooling, a thermal model which is configured for modeling both the impingement cooling and the parallel flow cooling. Accordingly, the temperature of the metal strip 1 determined with the method according to the present disclosure is more accurate than the temperature of the metal strip 1 determined with the prior art method, as it will presented hereinafter in view of FIGS. 5 to 10.

Figure 5:
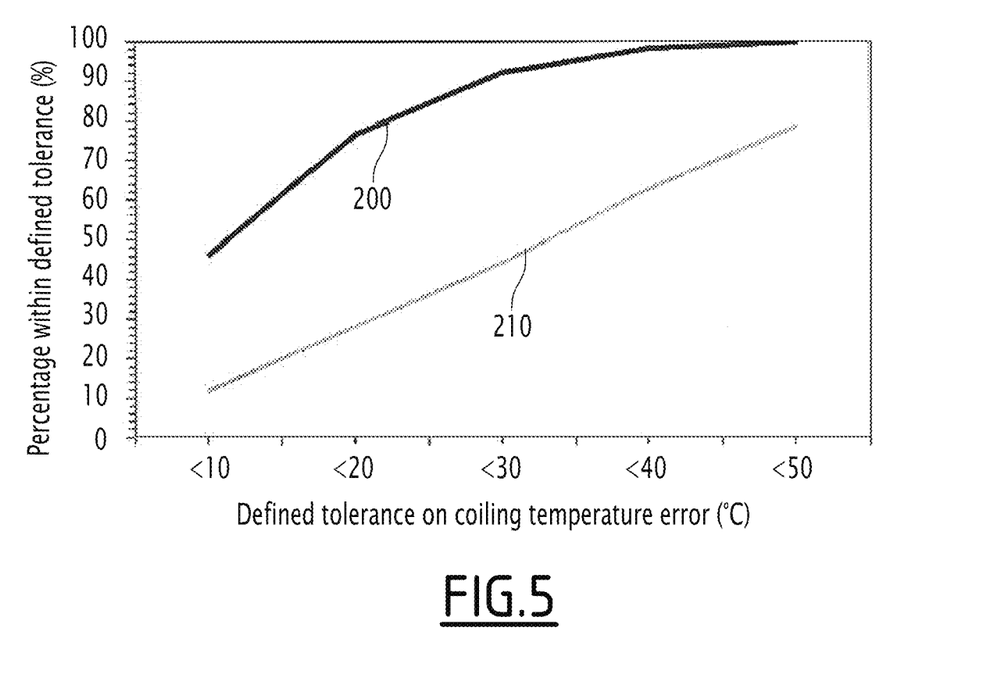
FIG. 5 are comparative curves of the method according to an embodiment of the invention and the prior art method regarding a tolerance on coiling temperature error, for a first plant including the hot-rolling installation of FIG. 1.

FIG. 5 shows two comparative curves 200, 210 for a first plant including the hot-rolling installation, regarding the percentage of coils that are provided within a defined tolerance on a coiling temperature error, said defined tolerance being indicated on abscissa axis. A first curve 200 illustrates the results of the method according to the present disclosure while a second curve 210 shows the results of the prior art method. It will be apparent for the skilled person that the results with the method according to the present disclosure are much better than the ones with the prior art method, since for value of the defined tolerance indicated on abscissa axis, the percentage of provided coils within said defined tolerance are each time better with the method according to the present disclosure than with the prior art method.

Figure 6:
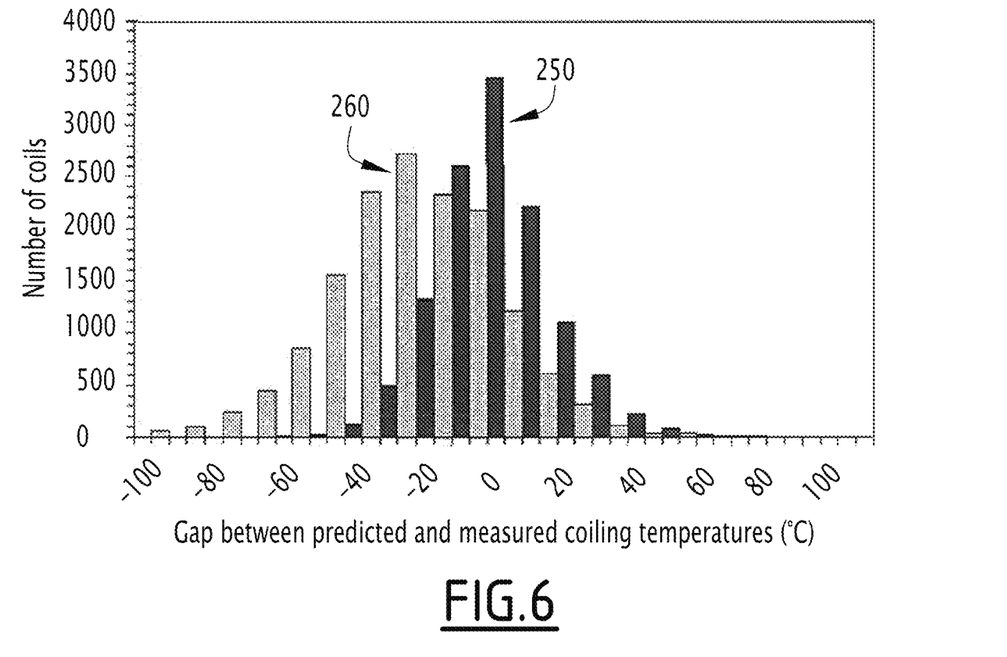
FIG. 6 are comparative histograms of the method according to an embodiment of the invention and the prior art method regarding a gap between predicted and measured coiling temperatures, for the first plant.

FIG. 6 shows two comparative histograms 250, 260 for the first plant indicating the number of coils that are provided for a respective gap between the predicted and measured coiling temperatures, said gap being indicated on abscissa axis. A first histogram 250 illustrates the results of the method according to the present disclosure while a second histogram 260 shows the results of the prior art method. It will be apparent for the skilled person that the results with the method according to the present disclosure are again much better than the ones with the prior art method, since for the low values of the gap indicated on abscissa axis, the number of provided coils are each time higher with the method according to the present disclosure than with the prior art method. Conversely, for high values of the gap, which correspond to a lower accuracy, the number of provided coils are each time higher with the prior art method than with the method according to the present disclosure.

Figure 7:
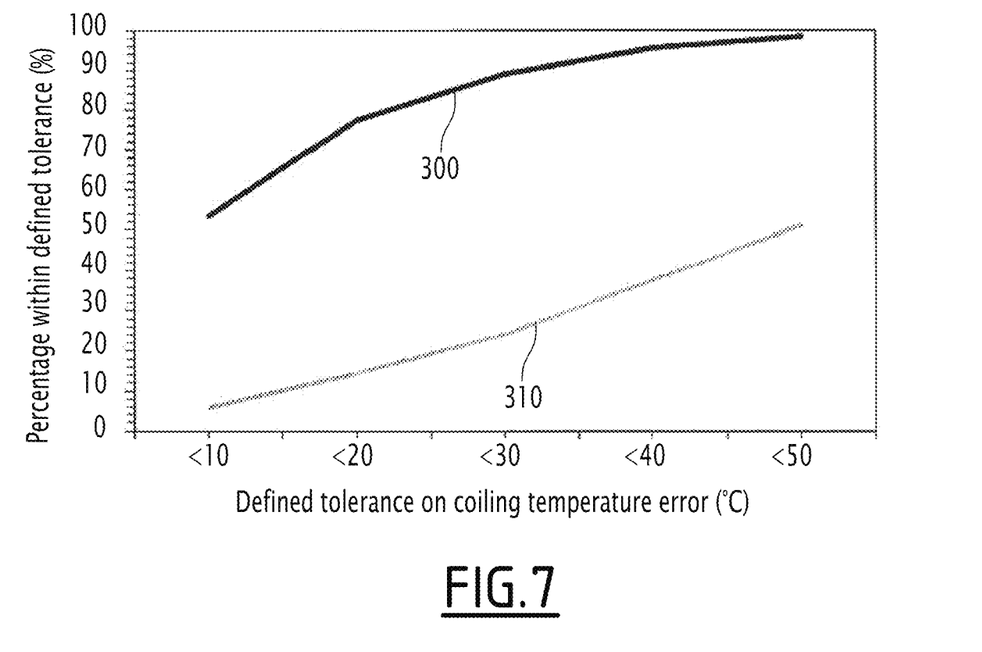
FIGS. 7 and 8 are figures similar to the respective FIGS. 5 and 6, for a second plant including the hot-rolling installation of FIG. 1.

Similarly to FIG. 5, FIG. 7 shows two comparative curves 300, 310 for a second plant including the hot-rolling installation, indicating the percentage of coils that are provided within a defined tolerance on a coiling temperature error. A third curve 300 illustrates the results of the method according to the present disclosure while a fourth curve 310 shows the results of the prior art method. It will be apparent for this second plant that the results with the method according to the present disclosure are also much better than the ones with the prior art method.

Figure 8:
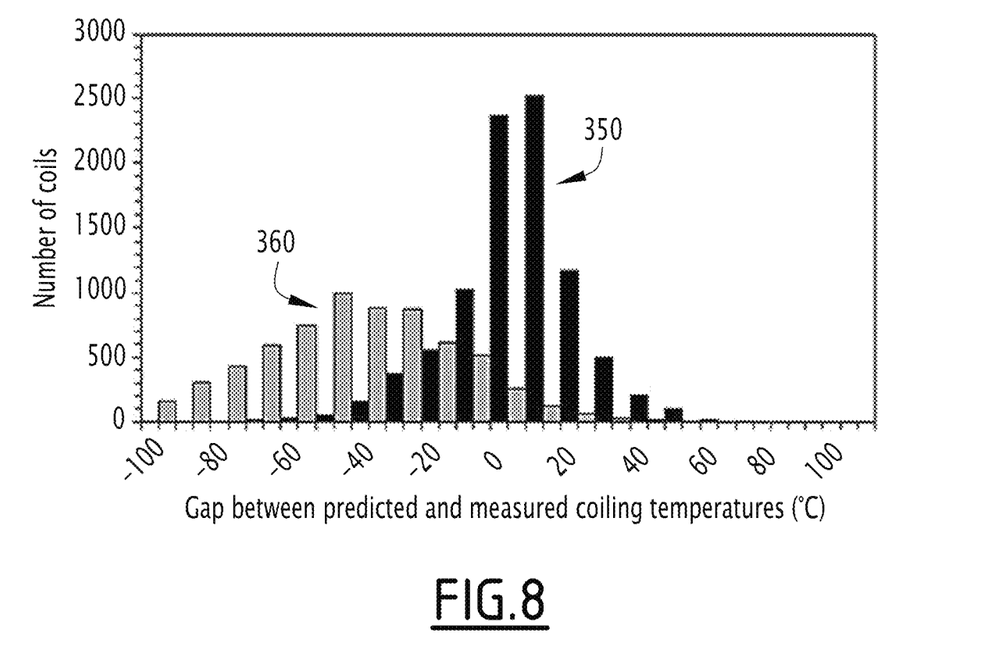

As for FIG. 6, FIG. 8 shows two comparative histograms 350, 360 for the second plant which indicate the number of coils that are provided for a respective gap between the predicted and measured coiling temperatures. A third histogram 350 illustrates the results of the method according to the present disclosure while a fourth histogram 360 shows the results of the prior art method. Again, it will be apparent that the results with the method according to the present disclosure are much better than the ones with the prior art method, since for the low values of the gap, the number of provided coils are higher with the method according to the present disclosure than with the prior art method, while for high values of the gap, the number of provided coils are higher with the prior art method than with the method according to the present disclosure.

Figure 9:
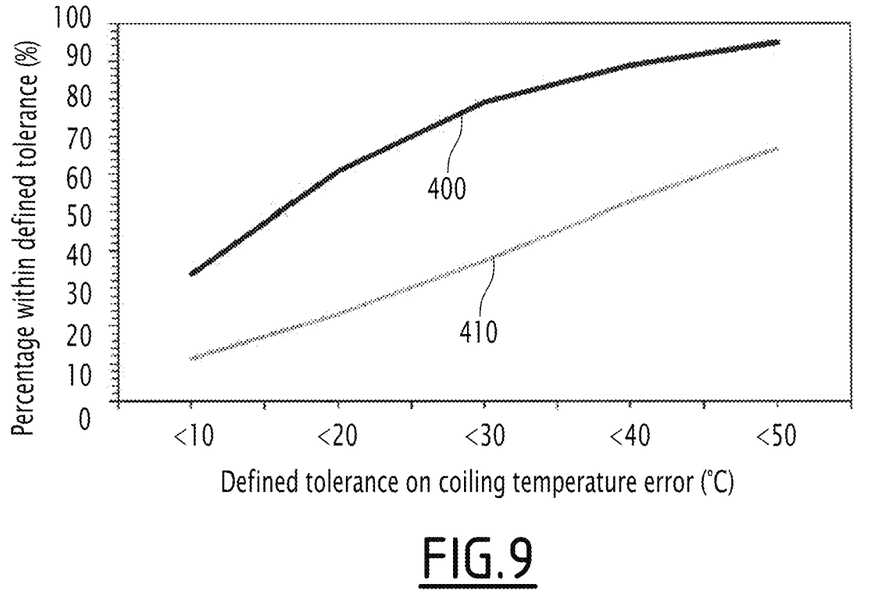
FIGS. 9 and 10 are figures similar to the respective FIGS. 5 and 6, for a third plant including the hot-rolling installation of FIG. 1.

Lastly, FIG. 9 shows, similarly to FIGS. 5 and 7, two comparative curves 400, 410 for a third plant including the hot-rolling installation, illustrating the percentage of coils that are provided within a defined tolerance on a coiling temperature error. A fifth curve 400 illustrates the results of the method according to the present disclosure while a sixth curve 410 shows the results of the prior art method. Again for this third plant the results with the method according to the present disclosure are better than the ones with the prior art method.

Figure 10:
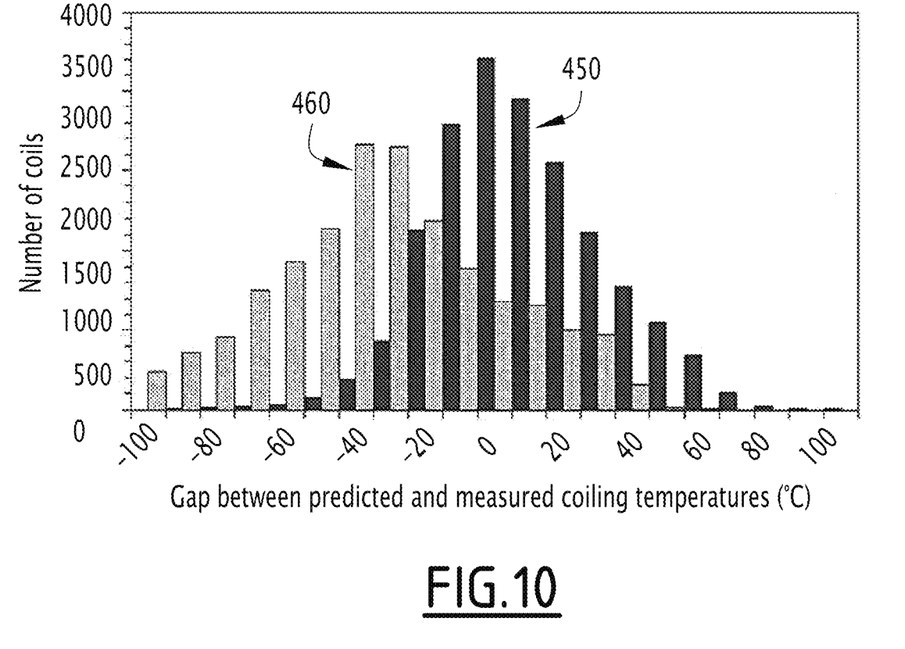

FIG. 10 shows, as for FIGS. 6 and 8, two comparative histograms 450, 460 for the third plant with the number of coils provided for a respective gap between the predicted and measured coiling temperatures. A fifth histogram 450 illustrates the results of the method according to the present disclosure while a sixth histogram 460 shows the results of the prior art method. The results with the method according to the present disclosure are still better than the ones with the prior art method.

Thus, the skilled person will notice that the results of the method according to the present disclosure are similar from one plant to another, as illustrated with the similar curves 200, 300, 400 and also with the similar histograms 250, 350, 450, while being always better than the results of the prior art method. The minor differences between the curves 200, 300, 400 and/or between the histograms 250, 350, 450 from one plant to another are due to differences between input data, in particular to sensors differences from one plant to another.

Despite these sensor differences, this similarity of the results from one plant to another shows that the method according to the present disclosure is much less sensitive to configuration differences or sensor differences than the prior art method.

Therefore, the method according to the present disclosure is also more robust. Indeed, its implementation in several distinct plants, as illustrated by the FIGS. 5 to 10, shows that the method according to the present disclosure is performing in several industrial configurations since there is no typical production line in the plants and the plants are almost different from one to another.

What is claimed is:

1. A method for controlling a cooling apparatus of a hot rolling installation, the method being implemented by an electronic control apparatus and comprising:
   determining the temperature of a metal strip, the strip being movable inside a cooling apparatus of a hot rolling installation, the determination of the temperature of the metal strip being implemented by an electronic determination device and comprising:
      acquiring a measure of a temperature of a strip portion at a current time instant
      estimating, at the current time instant, a heat flux extracted from the strip portion inside the cooling apparatus according to a thermal model, the thermal model being configured for modeling:
         an air cooling corresponding to a cooling of the strip portion by air radiation and air convection,
         a coolant header cooling corresponding to a cooling of the strip portion by at least one coolant header,
         a remaining coolant cooling corresponding to a cooling of the strip portion by coolant remaining on the strip portion after the strip portion passed under the at least one coolant header,
an impingement cooling corresponding to a cooling of the strip portion by coolant impinging from the at least one coolant header, and
a parallel flow cooling corresponding to a cooling of the strip portion by coolant falling at a given distance from the at least one coolant header; and
computing a temperature of the strip portion at a next time instant from the acquired measure of the temperature and the estimated extracted heat flux; and
controlling the cooling apparatus according to the determined temperature.

2. The method according to claim 1, wherein the thermal model for the impingement cooling depends on an impact diameter and on a Reynolds number of the coolant.

3. The method according to claim 2, wherein the estimated extracted heat flux due to the impingement cooling satisfies the following equation:

$$\varphi(T(t)) = Q_{FB}.Re^{0.5}.Pr^{1/6}.\frac{(\lambda_l.\lambda_v.\Delta T_{sub}.(T(t)-T_{sat}))^{0.5}}{D_{imp}}$$

where:
$\lambda_l$ and respectively $\lambda_v$ are thermal conductivities of the coolant in liquid state and respectively in the gaseous state,
$\Delta T_{sub}$ is equal to $T_{sat}-T_{coolant}$, in Celsius degrees,
$T_{sat}$ is a saturation temperature, from liquid state to gaseous state of the coolant, in Celsius degrees,
$T_{coolant}$ is the temperature of the coolant, in Celsius degrees,
T(t) is the acquired measure of the strip portion temperature at the current time instant t, in Celsius degrees,
$D_{imp}$ is the impact diameter,
Re is the Reynolds number of the coolant for the at least one coolant header,
Pr is the Prandtl number of the coolant, and
$Q_{FB}$ is a predefined coefficient.

4. The method according to claim 1, wherein the thermal model for the parallel flow cooling depends on a saturation temperature of the coolant.

5. The method according to claim 4, wherein the estimated extracted heat flux due to the parallel flow cooling satisfies the following equation:

$$\varphi(T(t)) = Q_{FB\_//1}.\left(Q_{FB\_//2} - Q_{FB\_//3}.\frac{T_{sat}-\Delta T_{sub}}{(T(t)-T_{sat})^{0.8}.(T(t)-T_{coolant})}\right)$$

where
$T_{sat}$ is a saturation temperature, from liquid state to gaseous state of the coolant, in Celsius degrees,
$\Delta T_{sub}$ is equal to $T_{sat}-T_{coolant}$, in Celsius degrees,
$T_{coolant}$ is the temperature of the coolant, in Celsius degrees,
T(t) is the acquired measure of the strip portion temperature at the current time instant t, in Celsius degrees, and
$Q_{FB\_//1}$, $Q_{FB\_//2}$, $Q_{FB\_//3}$ are predefined coefficients.

6. The method according to claim 1, wherein the thermal model for the remaining coolant cooling depends on a radiative air cooling flux, on an extracted heat flux previously estimated for the parallel flow cooling and on a length covered by the substrate portion within a remaining coolant section of the cooling apparatus.

7. The method according to claim 6, wherein the estimated extracted heat flux due to the remaining coolant cooling satisfies the following equation:

$$\varphi(T(t)) = \max\left(\text{radiative }(T(t)) + \text{convective }(T(t)), \frac{\varphi_{last\_//}}{2}.e^{length}\right)$$

where:
radiative(T(t)) and respectively convective(T(t)) are the radiative air cooling flux and respectively the convective air cooling flux,
$\varphi_{last\_//}$ is the extracted heat flux previously estimated for the parallel flow cooling, and
length is the length covered by the strip portion within the remaining coolant section.

8. The method according to claim 1, wherein the thermal model for the air radiation cooling depends on a strip portion temperature and on the Stefan constant.

9. The method according to claim 8, wherein the estimated extracted heat flux due to the air radiation cooling satisfies the following equation:

radiative$(T(t))=\sigma.\varepsilon.((T(t)+273)^4-(T_a+273)^4)$ where:
$\sigma$ is the Stefan constant,
$\varepsilon$ is the emissivity of the strip portion,
T(t) is the acquired measure of the strip portion temperature at the current time instant t, in Celsius degrees, and
$T_a$ is the air temperature, in Celsius degrees.

10. The method according to claim 1, wherein the thermal model for the air convection cooling depends on a strip portion temperature and on a heat exchange coefficient.

11. The method according to claim 10, wherein the estimated extracted heat flux due to the air convection cooling satisfies the following equation:

convective $(T(t))=H.(T(t)-T_a)$ where:
T(t) is the acquired measure of the strip portion temperature at the current time instant t, in Celsius degrees,
$T_a$ is the air temperature, in Celsius degrees, and
H is the heat exchange coefficient and satisfies:

$$H = \frac{2}{3}.\lambda_{air}.Re_{air}.Pr_{air}.\frac{1}{l} \text{ if } Re_{air} \leq 10^5, \text{ or}$$

$$H = \lambda_{air}.\frac{0{,}036.Re_{air}^{0.8}.Pr_{air}}{1+0.83.(Pr_{air}^{0.6}-1)}.\frac{1}{l} \text{ if } Re_{air} > 10^5,$$

with $\lambda_{air}$ the thermal conductivity of the air, $Re_{air}$ the Reynolds number of the air, $Pr_{air}$ the Prandtl number of the air and l the length of the strip portion cooled by the air.

12. The method according to claim 1, wherein the extracted heat flux is estimated for at least one surface among an upper surface and a lower surface of the strip portion.

13. The method according to claim 1, wherein the coolant includes water.

14. The method according to claim 1, wherein the metal strip is a hot-rolled steel strip.

15. A non-transitory computer-readable medium including a computer program including software instructions which, when executed by a processor, implement a method according to claim 1.

16. A control apparatus for controlling a cooling apparatus of a hot rolling installation, the control apparatus comprising:
- an electronic determination device for determining the temperature of a metal strip, the strip being movable inside the cooling apparatus, the electronic determination device comprising:
- an acquisition module configured for acquiring a measure of a temperature of a strip portion at a current time instant;
- an estimation module configured for estimating, at the current time instant, a heat flux extracted from the strip portion inside the cooling apparatus according to a thermal model, the thermal model being configured for modeling:
  - an air cooling corresponding to the cooling of the strip portion by air radiation and air convection,
  - a coolant header cooling corresponding to the cooling of the strip portion by at least one coolant header,
  - a remaining coolant cooling corresponding to the cooling of the strip portion by coolant remaining on the strip portion after the strip portion passed under the at least one coolant header,
  - an impingement cooling corresponding to the cooling of the strip portion by coolant falling under the at least one coolant header, and
  - a parallel flow cooling corresponding to the cooling of the strip portion by coolant falling at a given distance from the at least one coolant header, and
- a computation module configured for computing a temperature of the strip portion at a next time instant from the acquired measure of the temperature and the estimated extracted heat flux; and
- an electronic control device for controlling the cooling apparatus according to the temperature determined by the determination device.

17. A hot rolling installation for delivering a metal strip, the hot rolling installation comprising:
- a cooling apparatus for cooling the metal strip, and
- the control apparatus according to claim 16 for controlling the cooling apparatus.

* * * * *